UNITED STATES PATENT OFFICE 2,341,086

VALUABLE DERIVATIVES OF SULPHONAMIDES AND A METHOD OF MAKING THE SAME

Max Dohrn, Berlin-Charlottenburg, and Paul Diedrich, Finkenkrug, Osthavelland, near Berlin, Germany, assignors to Schering Corporation, Bloomfield, N. J., a corporation of New Jersey No Drawing. Application May 11, 1940, Serial No. 334,580. In Germany May 23, 1939

7 Claims. (Cl. 260—397.7)

This invention relates to valuable derivatives of sulphonamides and a method of making the same, and is a continuation in part of our copending application Ser. No. 253,734.

In U. S. application Ser. No. 253,734 methods are described for producing compounds of the type of therapeutically valuable sulphonamides corresponding to the general formula

in which R represents an aromatic, heterocyclic or aromatic-heterocyclic radical containing a nuclear bound amino group or a group convertible thereinto in p-position to the sulphonamide group, while Ac indicates an acyl residue.

These compounds containing the acyl residue in the sulphonamide group are produced according to the above mentioned copending application by acylating compounds of the formula $R.SO_2NH_2$ and reforming the nuclear bound amino group if necessary, or by reacting acid amides with aromatic, heterocyclic or aromatic-heterocyclic sulphonic acid halides containing a nuclear bound amino group or a group convertible thereinto and reforming, if necessary, the amino group.

In accordance with the present invention particularly valuable derivatives of compounds of this type are produced when compounds acylated in the sulphonamide group of the formula

in which R represents an aromatic or heterocyclic radical (including aromatic heterocyclic radicals) containing an amino group in p-position to the sulphonamide group (in the case of heterocyclic radicals, like pyridine, the 2,5-position will be involved), while Ac indicates any acyl radical, are brought into reaction with sulphonic acid halides of the formula $R'.SO_2.Hal$, wherein R' indicates an aromatic or heterocyclic radical (including aromatic-heterocyclic radicals) containing an amino group or a group convertible thereinto, whereafter, if necessary, the amino group is reformed.

Where such amino group is substituted by an acyl group, such group should be one which splits off more readily on hydrolysis than the acyl group on the sulphonamide group of the other reactant.

The compounds of the general formula

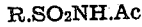

employed as starting materials in the present invention may be obtained, as described in our above identified application, by reacting a compound of the formula $R.SO_2NH_2$ with an acylating agent, such as an acid anhydride, an acyl chloride, ketenes, and the like. Where the radical R contains also a free amino group, the acylation must be carried out in such a manner that acylation of both such amino group and of the sulphonamido group will take place; then by partial hydrolysis the acyl group of the nuclearly bound amino group can be split off. Also, acylating agents can be used which are capable of acylating only the sulphonamide group while leaving the nuclearly bound amino group unchanged. The starting compounds of the present invention may also be produced by reacting a compound of the formula $R.SO.Hal$ with an acid amide in the presence or absence of condensing agents and/or catalysts and, if necessary, the nuclearly bound amino group subsequently produced. Instead of the acid amides, it is also possible to employ their metal compounds, for example, the silver compounds or the like. It is also possible to cause suitable salts of the sulphonic acids, such as alkali or alkaline earth metal salts, to react with the acid amide, in which case the reaction is conducted in the presence of such agents as are capable of intermediately forming, from the sulphonates, anhydrides or chlorides which then enter into reaction with the acid amide. Such agents are, for example, sulphuryl chloride or chlorides of the employed sulphonic acids themselves.

The following formulae illustrate, for example, the course of this reaction:

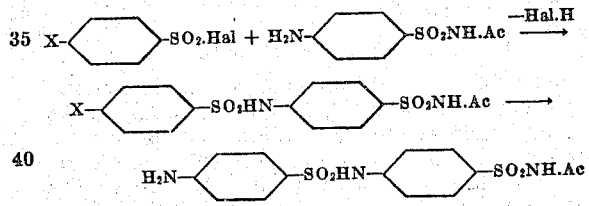

The starting material of the formula

may be obtained according to the process of the above mentioned copending application.

The new compounds acylated in the sulphonamide group can be converted according to methods known per se into their salts according to the methods described in the above mentioned copending application.

The following example illustrates the invention without, however, limiting the same to them:

EXAMPLE

*4,4'-aminobenzene sulphon amide benzene sulphonacetyl amide*

26.4 grs. of 4-carbethoxyaminobenzene sulphonic acid chloride, 21.4 grs. of 4-aminobenzene sulphonacetylamide, M. P. 181° C., 10 grs. of sodium bicarbonate and 100 ccs. of acetone are heated to boiling for several hours. Thereafter the acetone is removed by distillation, the residue treated with dilute sodium carbonate solution and the filtered solution acidified with hydrochloric acid. The precipitated 4-carbethoxy derivative is recrystallized from alcohol and has a melting point of 212° C. For splitting off the carbethoxy group and, thus, producing the free nuclear bound amino group the compound obtained is treated with 2-N-sodium hydroxide solution at room or elevated temperature until a sample is soluble in hydrochloric acid. The compound precipitated therefrom with acetic acid as an oil solidifies soon. After recrystallisation from methanol the 4,4'-amino benzene sulphon amide benzene sulphonacetyl amide obtained melts at 209° C. It is readily soluble in acetone and methyl alcohol, more difficultly soluble in methyl alcohol and acetic acid ester, insoluble in chloroform, ether, benzene, petrol ether, and water.

In place of the 4-carbethoxy-amino benzene sulphochloride also other compounds of the general formula Y—R'SO2Hal may be employed, in which R' is an aromatic, heterocyclic or aromatic-heterocyclic radical, and Y a group convertible into an amino group, like a nitro, acetylamino, carbobenzoxyamino group, etc. Similarly, there can be used in place of the above employed 4-amino benzene sulphon acetylamide also other sulphonacylamides of the general formula

R.SO2.NHX wherein R is an aromatic, heterocyclic, or aromatic-heterocyclic radical with at least one nuclear-bound amino group or a group containing a nuclear-bound nitrogen atom and thus convertible into a free amino group, and X the desired acyl residue of a carboxylic acid. Thus R may be phenyl or pyridyl, while X may be propionyl, butyryl, crotonyl, benzoyl, p-nitrobenzoyl, nicotoyl, phenacetyl, furoyl, hydnochaulyl, adipyl, mucyl, and carbethoxy, all as described in our above mentioned application.

The compounds obtained according to the process described and claimed herein and corresponding to the formula X.R3.SO2.NH.R2.SO2.NH.Ac wherein R2 and R3 indicate aromatic, heterocyclic and aromatic-heterocyclic radicals, and Ac an acyl residue, and X an amino group or a group convertible thereinto, may be converted into their salts in the same manner as described in the copending application Serial No. 253,734. Thus these compounds, whose hydrogen atom of the sulphonacylamido group is replaceable with a metal, may be reacted with the hydroxides, carbonates, or oxides, of the alkali and alkaline earth metals, gold, copper, mercury, silver, aluminum, magnesium, and the like. The salts of the above indicated compounds can be prepared also by double decomposition; for instance, the acylated sulphonamide salts of alkaline earth metals, whose sulphates are insoluble, can be reacted with soluble sulphates of heavy metals. Thereby the insoluble alkaline earth metal sulphate is precipitated, while the heavy metal salt of the acylated sulphonamide remains in solution and is isolated therefrom. Also organic bases, such as, for example, alkylamines, alkanolamines, like ethanolamines, pyridine, aniline, 1-phenyl-2.3-dimethyl-4-dimethyl-amino-5-pyrazolone, quinine and others, are suitable for salt formation.

Of course, many changes and variations in the reaction conditions and the like may be employed by those skilled in the art in accordance with the principles set forth herein and in the claims annexed hereto.

What we claim is:

1. 4,4'-aminobenzenesulphonamidobenzenesulphonacetylamide of the formula

H2N.C6H4SO2NH.C6H4.SO2NHCOCH3 having a melting point of about 209° C. and being readily soluble in acetone and ethylalcohol, more difficultly soluble in methylalcohol and acetic acid ester, insoluble in chloroform, petrol ether, and water.

2. A method of producing derivatives of sulphonamides comprising condensing a compound acylated in the sulphonamide group and corresponding to the formula R.SO2NH.Ac in which R represents a phenyl group containing a free amino group in p-position to the sulphonamide group, while Ac indicates the acyl radical of a carboxylic acid, with a sulphonic acid halide of the formula R'SO2Hal, wherein R' indicates a phenyl radical containing in p-position a member of the group consisting of a free amino group and groups containing a nuclearly-bound nitrogen atom.

3. Process as claimed in claim 2, wherein the second reactant is an acyl amino benzene sulphonic acid halide, the acyl group being that of a carboxylic acid and being more readily split off by hydrolysis than the acyl group of the acylated sulphonamide group of the other reaction component.

4. Process as claimed in claim 2, wherein the first reactant is p-amino benzene sulphonacetyl amide.

5. Process as claimed in claim 2, wherein the second reactant is a p-carbalkyloxyaminobenzenesulphonic acid halide.

6. Process as claimed in claim 2, wherein the compound obtained is converted into a salt by reacting the same with a metal base.

7. A member of the group consisting of sulphonamides of the general formula

X.R'.SO2.NH.R.SO2.NH.Ac and their salts, wherein R and R' represent phenyl groups and X a member of the class consisting of a free amino group and groups containing a nuclearly-bound nitrogen atom and located in the p-position, while Ac indicates the acyl radical of a carboxylic acid, the —SO2NH.Ac group being likewise in the p-position.

MAX DOHRN.
PAUL DIEDRICH.